INVENTOR
WESLEY C. SEWELL

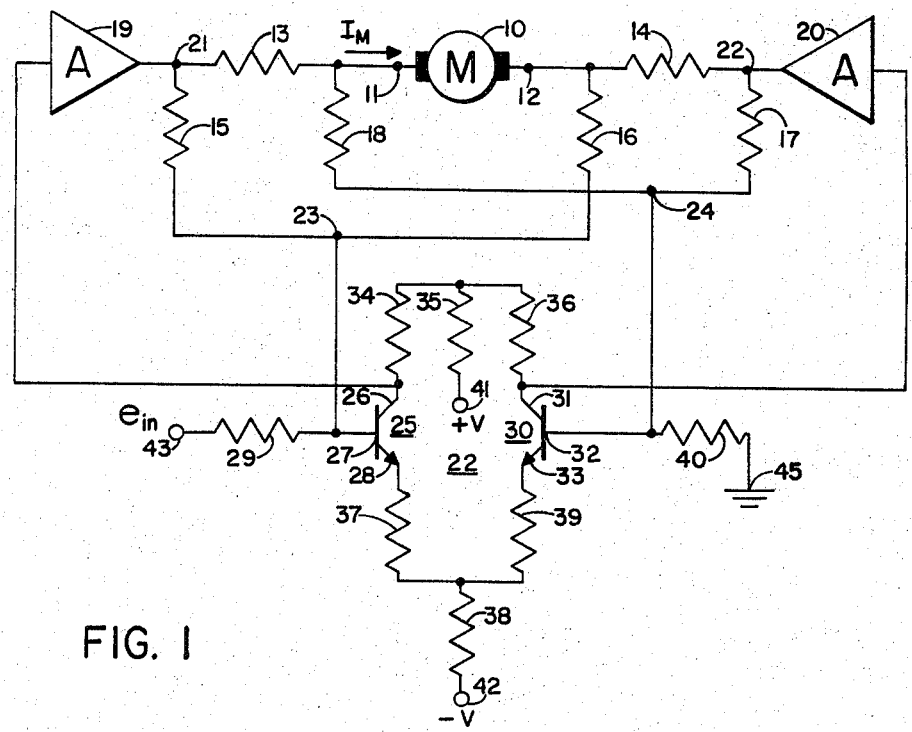
FIG. 1
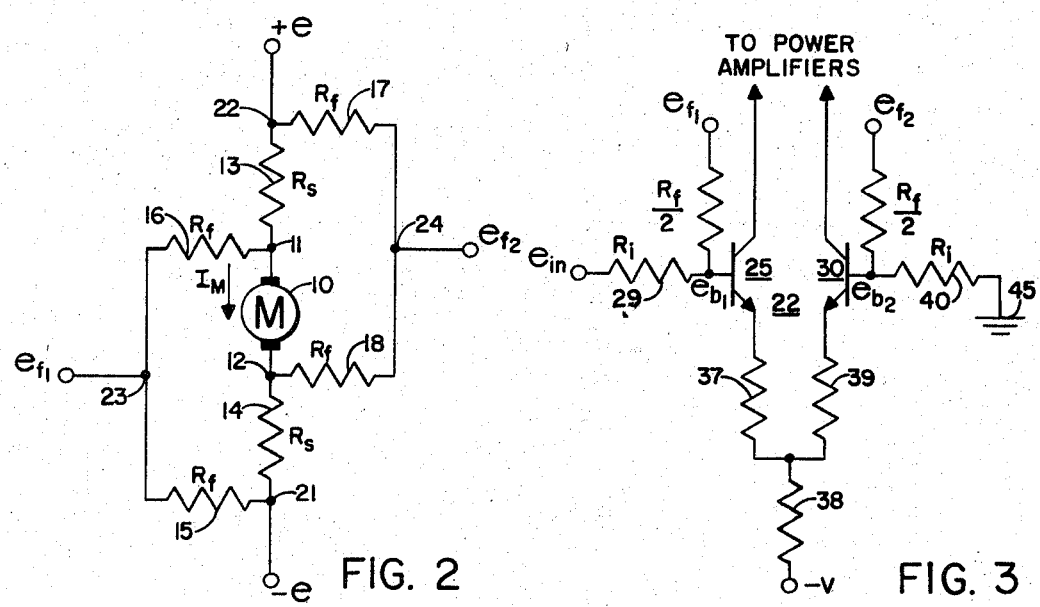
FIG. 2
FIG. 3
INVENTOR.
WESLEY C. SEWELL

United States Patent Office 3,422,366
Patented Jan. 14, 1969

3,422,366
CONSTANT CURRENT DIFFERENTIAL AMPLIFIER WITH CURRENT SENSING AND FEEDBACK NETWORKS
Wesley C. Sewell, Clearwater, Fla., assignor to Honeywell Inc., Minneapolis, Minn., a corporation of Delaware
Filed May 31, 1966, Ser. No. 553,942
U.S. Cl. 330—30　　　　　　　　　　　　　　　7 Claims
Int. Cl. H03f 3/68

The present invention pertains to motor control circuits. More particularly the invention pertains to a power amplifier for driving a DC torque motor with a current which is proportional to the voltage applied to the input of the amplifier.

A unique feature of the constant current power amplifier is a current sensing and feedback network which provides both common mode and differential feedback. The amplifier has two output stages for connection to the opposite sides of the DC motor. The common mode feedback maintains the two output lines to the motor at equal but opposite potentials with respect to a reference potential. When one end of the motor is driven positive, the other end is driven negative by an equal amount. This allows both output stages to have positive and negative voltage swing capabilities. The differential feedback maintians the motor current proportional to the amplifier input voltage.

The current sensing and feedback network is comprised of two equal current sensing resistors and four equal precision feedback resistors. The two current sensing resistors are connected respectively to opposite sides of the motor, in series with the main energizing current through the motor. The voltage drop developed across these two resistors thus is proportional to the current through the motor. The four precision feedback resistors are connected in two series pairs. One of the resulting series pair combinations is connected to form a parallel path with the motor and one of the current sensing resistors, while the other feedback resistors series combination is connected to form a parallel path with the motor and the other of the current sensing resistors. If the feedback resistors are closely matched, the voltage at the junction between each pair of feedback resistors will be exactly one half the voltage drop across the current sensing resistor in the parallel current path.

The voltages appearing at the junctions between the feedback resistors are applied to the base electrodes of the transistors in a differential amplifier input stage. The collector electrodes of the differential amplifier transistors are connected respectively to one of two power amplifiers whose outputs are connected to the opposite ends of the motor.

It is therefore an object of the present invention to provide an improved control circuit which provides an output current proportional to the input voltage.

A more specific object of the present invention is to provide a control circuit to drive a DC torque motor with a current which is proportional to the input voltage of the control circuit.

A still more specific object of the present invention is to provide, in a power amplifier, a feedback circuit which provides both common mode and differential feedback.

These and other objects will become apparent to those skilled in the art upon examination of the following specification, claims, and drawings, of which:

FIGURE 1 is a simplified schematic representation of the motor control circuit according to the present invention;

FIGURE 2 is a schematic representation of the feedback arrangement incorporated in the circuit of FIGURE 1;

FIGURE 3 illustrates a differential amplifier input stage also shown in FIGURE 1;

Figure 4:
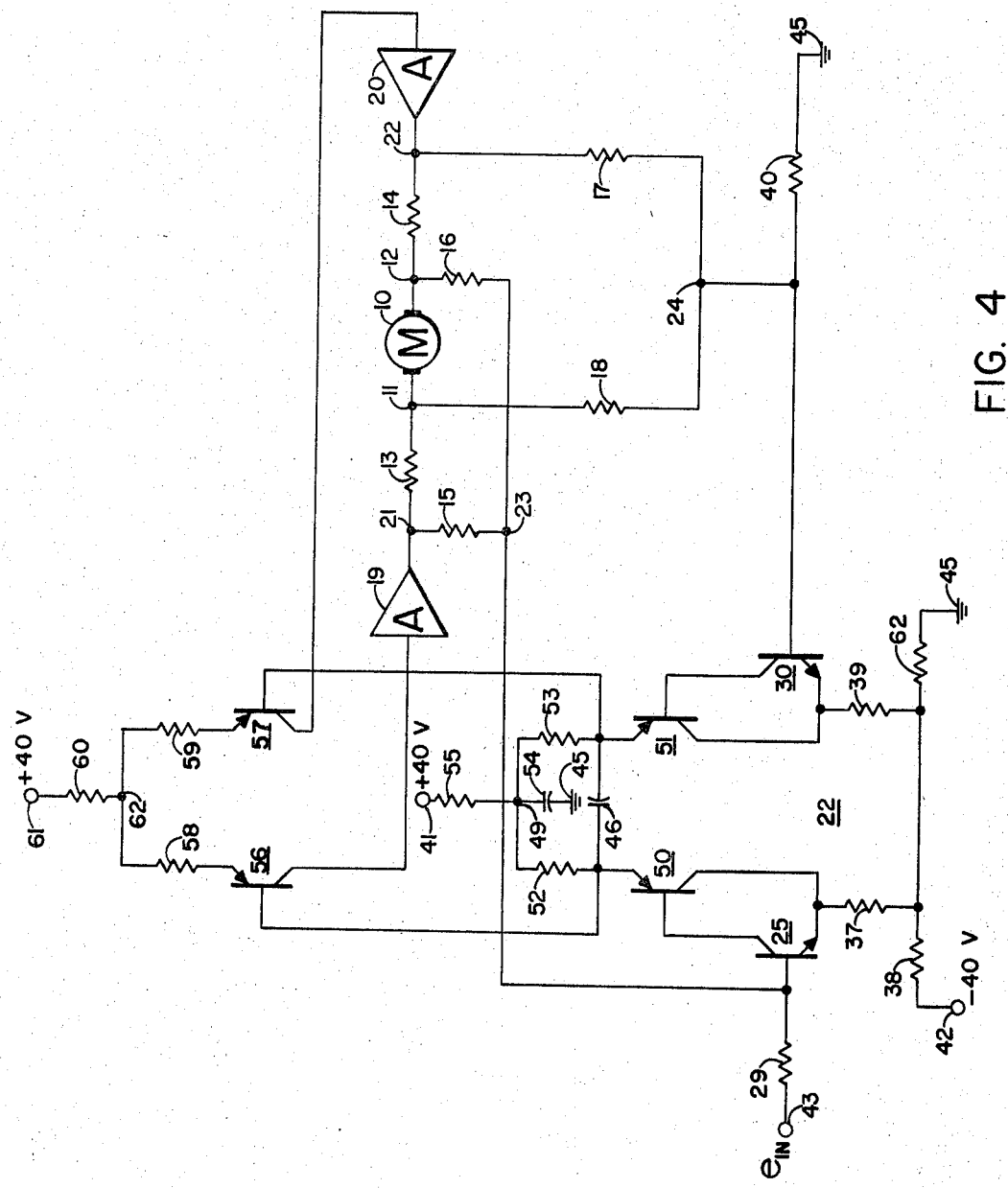
FIGURE 4 illustrates in more detail an embodiment of the control circuit according to the present invention which has been reduced to practice and found to give satisfactory operation.

Referring now to FIGURE 1, a motor 10 is shown with input terminals 11 and 12. A differential amplifier input stage 22 is shown with transistors 25 and 30. Transistor 25 has a collector 26, a base 27, and an emitter 28, while transistor 30 has a collector 31, a base 32, and an emitter 33. A resistor 34 is connected at one end to collector 26 of transistor 25 and is connected at its other end to one end of a resistor 36, whose other end is connected to collector electrode 31 of transistor 30. A resistor 35 is connected between the junction of resistors 34 and 36 and a positive potential terminal 41. A resistor 37 is connected at one end to emitter 28 of transistor 25 and is connected at its other end to one end of a resistor 39 whose other end is connected to emitter 33 of transistor 30. A resistor 38 is connected between the junction of transistors 37 and 39 and a negative potential terminal 42. Base 32 of transistor 30 is connected to ground terminal 45 through a resistor 40, while base 27 of transistor 25 is connected to an input terminal 43 through a resistor 29.

Collector 26 of transistor 25 is also connected directly to the input of an amplifier 19, whose output is connected to terminal 11 of motor 10 through a series current sensing resistor 13. Collector electrode 31 of transistor 30 is connected directly to the input of an amplifier 20, whose output is connected, through a series current sensing resistor 14, to terminal 12 of motor 10. Current sensing resistors 13 and 14 are of substantially equal value.

Feedback is provided from the motor to input stage 22 through four closely matched precision resistors 15, 16, 17 and 18. Resistor 15 is connected at one end to a junction 21 between amplifier 19 and current sensing resistor 13. The other end of resistor 15 is connected to a junction 23. Resistor 16 is connected between terminal 12 of motor 10 and junction 23. Junction 23, between resistors 15 and 16, is connected directly to base 27 of transistor 25. Precision feedback resistor 17 is connected at one end to a junction 22 between amplifier 20 and current sensing resistor 14. The other end of resistor 17 is connected to a junction 24. Feedback resistor 18 is connected between terminal 11 of motor 10 and junction 24. Junction 24, between resistors 17 and 18, is connected directly to base 32 of transistor 30.

The operation of FIGURE 1 can be more easily understood by first analyzing the operation of FIGURES 2 and 3 where the feedback network and the input stage are shown respectively.

The current sensing and feedback circuitry illustrated in FIGURE 2 provides both common and differential feedback. The common mode feedback maintains the two output lines to motor 10 at equal but opposite potentials with respect to a reference potential. The two output circuits will thus have equal positive and negative voltage swing capabilities. The differential feedback maintains the motor current proportional to the amplifier input voltage.

The current sensing and feedback circuit, shown in FIGURE 2 comprised of current sensing resistors 13 and 14 and four precision resistors 15, 16, 17 and 18. Current sensing resistors 13 and 14 are of equal size and develop a voltage drop proportional to the current through the motor. The four precision feedback resistors are closely matched with a .001 percent resistance tolerance. This precision tolerance is necessary to insure that the large voltage swing on each end of the motor will buck each other out and leave only one half the voltage drop across the current sensing resistor at the summing points of the feedback resistors. Terminal +E and —E represent outputs of amplifiers 20 and 19 in FIGURE 1, respectively. Assuming that the common mode feedback will hold E and —E to equal but opposite polarity voltages, the values of $e_{f1}$ and $e_{f2}$ can be calculated as follows:

$$e_{f1} = \frac{(e - I_M R_S) - e}{2} = \frac{-I_M R_S}{2}$$

$$e_{f2} = \frac{(-e) - (-e + I_M R_S)}{2} = \frac{I_M R_S}{2}$$

Source of impedance for $e_{f1}$ and $e_{f2}$ is simply $R_f/2$.

The schematic of FIGURE 3 shows a simplified version of the input differential stage with an input $e_{in}$ and feedback $e_{f1}$ and $e_{f2}$ using the equivalent impedance value developed with reference to the circuit of FIGURE 2. The loop gain is greater than 30 db and the differential pair of transistors 25 and 30 are matched. Voltages $e_{b1}$ and $e_{b2}$ can therefore be assumed to be equal. The base impedance to the bases of transistors 25 and 30 is very high compared to $R_f/2$ and therefore can be ignored. With these assumptions, the following equations can be written to derive the motor current $I_M$ as the function of the input voltage $e_{in}$.

$$\frac{E_{f2}(R_i)}{\frac{R_f}{2} + R_i} = e_{b2}$$

$$e_{in} + \left[\frac{e_{f1} - e_{in}}{\frac{R_f}{2} + R_i}\right] R_i = e_{b1}$$

$$e_{1i} = e_{b2}$$

$$\frac{e_{f2}(R_i)}{\frac{R_f}{2} + (R_i)} = e_{in} + \left[\frac{e_{f1} - e_{in}}{\frac{R_f}{2} + R_i}\right] R_i$$

$$e_{f2} R_i = \frac{e_{in} R_f}{2} + e_{in} R_i + R_i e_{f1} - e_{in} R_i$$

$$\frac{e_{in} R_f}{2} = R_i (e_{f2} - e_{f1})$$

$$\frac{e_{f2} - e_{f1}}{e_{in}} = \frac{R_f}{2 R_i}$$

From the derivation of $e_{f1}$ and $e_{f2}$:

$$e_{f1} = \frac{-I_M R_S}{2}$$

$$e_{f2} = \frac{I_M R_S}{2}$$

Therefore:

$$\frac{e_{f2} - e_{f1}}{e_{in}} = \frac{\frac{I_M R_S}{2} - \left(\frac{-I_M R_S}{2}\right)}{e_{in}} = \frac{R_f}{2 R_i}$$

$$\frac{I_M R_S}{e_{in}} = \frac{R_f}{2 R_i}$$

$$\frac{I_M}{e_{in}} = \frac{R_f}{2 R_i R_S}$$

The circuit provides a means for sensing the current in a load driven at both ends by two power amplifiers 19 and 20 operating 180 degrees out of phase. The sensing signal is sent back to the input stage of the amplifier for comparison with the input signal. The simple resistor network shown in FIGURE 2 performs a function the accomplishment of which would otherwise require an elaborate differential feedback amplifier with a high degree of common mode rejection.

Figure 5:
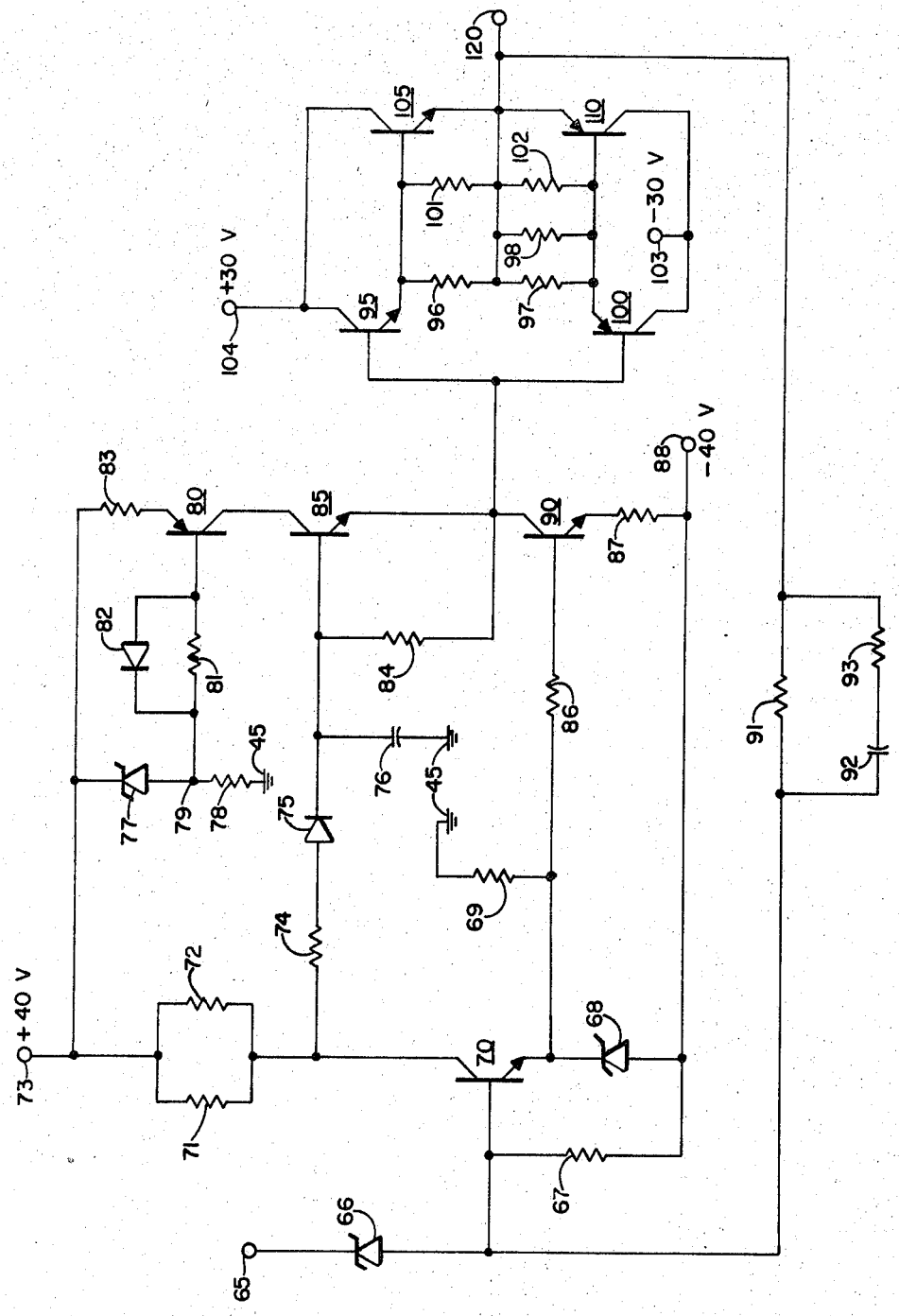
FIGURE 5 illustrates a schematic diagram of an amplifier circuit, of which two are used in the circuit of FIGURE 4, wherein they are depicted in block form.

FIGURES 4 and 5 show an embodiment of the present invention which has been successfully reduced to practice. FIGURE 4 is very similar to FIGURE 1 except that four additional transistors 50, 51, 56 and 57 are connected between the input stage 22 and amplifier 19 and 20. The collector electrode of transistor 50 is connected to the emitter electrode of transistor 25, while the base electrode of transistor 50 is connected to collector electrode of transistor 25. Collector electrode of transistor 51 is connected to the emitter electrode of transistor 30 and base electrode of transistor 51 is connected to the collector electrode of transistor 30. A capacitor 46 is connected between the emitter electrodes of transistors 50 and 51. A resistor 52 is connected between the emitter electrode of transistor 50 and a junction point 49, a resistor 53 is connected between the emitter electrode of transistor 51 and a junction point 49, and a capacitor 54 is connected between junction point 49 and ground terminal 45. Junction 49 is connected to a positive potential terminal 41 through a resistor 55. The emitter electrode of transistor 50 is connected directly to the base electrode of a transistor 56, and the emitter electrode of transistor 51 is connected directly to the base electrode of transistor 57. A resistor 58 is connected between the emitter electrode of transistor 56 and a junction point 62, a resistor 59 is connected between the emitter electrode of transistor 57 and junction point 62, and a resistor 60 is connected between junction point 62 and a positive potential terminal 61. The collector electrode of transistor 56 is connected directly to the input of amplifier 19 and the collector electrode of transistor 57 is connected directly to the input of amplifier 20.

The circuits of amplifiers 19 and 20 are substantially identical to each other except that they operate in 180 degrees phase relationship. The schematic circuit of FIGURE 5 is representative of either amplifier 19 or 20.

The voltages applied at different points and the circuit of FIGURE 4 are shown in the drawing. The following values of circuit elements have proven to result in satisfactory operation:

Resistors:

| | | |
|---|---|---|
| 13 | ohms | ~1 |
| 14 | do | ~1 |
| 15 | do | 12K |
| 16 | do | 12K |
| 17 | do | 12K |
| 18 | do | 12K |
| 29 | do | 66.5K |
| 37 | do | 33.2 |
| 38 | do | 30.1K |
| 39 | do | 33.2 |
| 40 | do | 66.5K |
| 52 | do | 1K |
| 53 | do | 1K |
| 55 | do | 20K |
| 58 | do | 511 |
| 59 | do | 511 |
| 60 | do | 20K |
| 62 | do | 1.5K |

Capacitors:

| | | |
|---|---|---|
| 46 | μf | .004 |
| 54 | μf | 10 |

In FIGURE 5 of Zener diode 66 is connected between a base electrode of a transistor 70 and an input terminal 65. The Zener diode is oriented for reverse current flow from the input terminal 65 to the base electrode of transistor 70. A pair of parallel resistors 71 and 72 are connected between the collector electrode of transistor 70 and a positive potential terminal 73. A resistor 67 is connected between the base electrode of transistor 70 and a negative potential terminal 88 and a Zener diode 68 is connected between the emitter electrode of transistor 70 and the negative potential terminal 88. Zener diode 68 is connected for reverse current flow from emitter electrode of transistor 70 to termial 88. The emitter electrode of transistor 70 is also connected to ground potential terminal 45 through a resistor 69, and is further connected to the base electrode of a transistor 90 through a resistor 86. The emitter electrode of transistor 90 is connected by means of a resistor 87 to the negative potential terminal 88. The collector electrode of transistor 90 is connected directly to an emitter electrode of a transistor 85.

The base electrode of transistor 85 is connected to the collector electrode of transistor 70 through a series combination of a resistor 74 and a diode 75, diode 75 being oriented for forward current flow from the collector electrode of transistor 70 to the base electrode of transistor 85. The base electrode of transistor 85 is connected to ground potential terminal 45 through a capacitor 76 and is also connected to the collector electrode of transistor 90 through a resistor 84.

The collector electrode of transistor 85 is connected to a collector electrode of a transistor 80. The emitter electrode of transistor 80 is connected through a resistor 83 to positive potential terminal 73, while the base electrode of transistor 80 is connected to a junction point 79 through a parallel combination of a resistor 81 and a diode 82, diode 82 being oriented for forward current flow from the base of transistor 80 to junction point 79. A resistor 78 is connected between junction point 79 and ground potential terminal 45, while a Zener diode 77 is connected between junction point 79 and the positive potential terminal 73, Zener diode 77 being oriented for reverse current flow from positive potential terminal 73 to junction point 79.

The collector electrode of transistor 90 is further connected to the base electrodes of transistors 95 and 100. The collector electrode of transistor 95 is connected to a positive potential terminal 104 and the emitter electrode of the transistor 95 is connected directly to the base electrode of a transistor 105. The collector electrode of transistor 100 is connected to negative potential terminal 103 and the emitter electrode of transistor 100 is connected directly to the base electrode of a transistor 110. The emitter electrode of transistors 105 and 110 are connected to each other, the collector electrode of transistor 105 is connected to the positive potential terminal 104 and the collector electrode of transistor 110 is connected to the negative potential terminal 103. The emitter electrodes of transistors 105 and 110 are further connected directly to output terminal 120. A pair of resistors 96 and 101 are connected in parallel between the base and the emitter electrodes of transistor 105, while resistors 97, 98 and 102 are connected in parallel between the base and the emitter electrodes of transistor 110.

A feedback network is connected between the output terminal 120 and the base electrode of transistor 70. This feedback network is comprised of resistor 91 connected directly between output terminal 120 and the base electrode of transistor 70 and a series combination of a resistor 93 and a capacitor 92 connected in parallel with resistor 91.

The operation of the amplifier of FIGURE 5 will be apparent to one skilled in the art. The voltages applied to various points in the circuit are indicated on the drawing of FIGURE 5. It should be understood that the particular amplifier circuit is for illustrative purposes only and that other amplifiers would provide equally satisfactory operation. In this particular embodiment, the following values of circuit elements have been used:

Resistor:
| | | |
|---|---|---|
| 67 | ohms | 10K |
| 69 | do | 30K |
| 71 | do | 100K |
| 72 | do | 100K |
| 74 | do | 1.5K |
| 78 | do | 2.7K |
| 81 | do | 1.0K |
| 83 | do | 820 |
| 84 | do | 20K |
| 86 | do | 10K |
| 87 | do | 4.7K |
| 91 | do | 100K |
| 93 | do | 15.5K |
| 96 | do | 10 |
| 97 | do | 10 |
| 98 | do | 10 |
| 101 | do | 10 |
| 102 | do | 10 |

Capacitor:
| | | |
|---|---|---|
| 76 | pf | 180 |
| 92 | pf | 330 |

Zener diode:
| | | |
|---|---|---|
| 66 | volts | 18 |
| 68 | do | 9.1 |
| 77 | do | 10.0 |

Many variations and embodiments are possible within the spirit of this invention. It is therefore understood that the specific embodiment of my invention shown here is for the purpose of illustration only, and that my invention is limited only by the scope of the appended claims.

I claim:
1. A control circuit for driving a DC load with a current which is proportional to the voltage at the input of the circuit, said control circuit comprising:
   first and second output terminals for connection to a DC load;
   an input stage comprising a differential amplifier having first and second inputs, and first and second outputs, said first input being adapted to receive an input signal and said second input being connected through an impedance to a point of reference potential;
   first and second substantially equal current sensing resistors each having first and second ends;
   means connecting the first end of said first current sensing resistor to said first output of said differential amplifier and means connecting the second end of said first sensing resistor to said first output terminal;
   means connecting the first end of said second current sensing resistor to said second output of said differential amplifier and means connecting the second end of said second sensing resistor to said second output terminal;
   a first pair of closely matched precision feedback resistors, the two resistors of said first pair being connected together and to said first input of said differential amplifier at one end and being connected at their other ends respectively to said first end of said first current sensing resistor and to said second output terminal;
   a second pair of closely matched precision feedback resistors, the two resistors of said second pair being connected together and to said second input of said differential amplifier at one end and being connected at their other ends respectively to said first end of said second current sensing resistor and to said first output terminal.

2. Apparatus according to claim 1 wherein said first pair of feedback resistors are equal to said second pair of feedback resistors.

3. Apparatus according to claim 1 wherein said feedback resistors are at least 1000 times larger than said current sensing resistors.

4. Apparatus according to claim 1 wherein said means connecting the first end of said first current sensing resistor to said first output of said differential amplifier includes a first DC amplifier and said means connecting first end of said second current sensing resistor to said second output of said differential amplifier includes a second DC amplifier.

5. Apparatus according to claim 1 wherein said differential amplifier in said input stage includes first and second transistors where the base electrodes of said first and second transistors are first and second inputs respectively and the collector electrodes of said first and second transistor are said first and said second outputs of said input stage.

6. Differential and common mode feedback circuit for a constant current differential amplifier having first and second inputs and first and second outputs, said circuit comprising:

first and second power input terminals for connection respectively to said first and second outputs of said differential amplifier;

first and second output terminals for connection to a DC load;

first and second feedback terminals for connection respectively to said first and second inputs of said differential amplifier;

first and second substantially equal current sensing resistors, said first current sensing resistor being connected between said first power input terminal and said first output terminal, and said second current sensing resistor being connected between said second power input terminal and said second output terminal;

first, second, third, and fourth closely matched precision feedback resistors;

means connecting said first feedback resistor between said first input terminal and said first feedback terminal;

means connecting said second feedback resistor between said second output terminal and said first feedback terminal;

means connecting said third feedback resistor between said second input terminal and said second feedback terminal; and means connecting said fourth feedback resistor between said first output terminal and said second feedback terminal.

7. Apparatus according to claim 6 wherein said feedback resistors are at least 1000 times larger than said current sensing resistors.

References Cited

UNITED STATES PATENTS 3,371,286    2/1968    Lovelace _____ 330—30 X

JOHN KOMINSKI, *Primary Examiner.*

L. J. DAHL, *Assistant Examiner.*

U.S. Cl. X.R.

318—345; 330—26